United States Patent [19]

Burns

[11] Patent Number: 4,774,312

[45] Date of Patent: Sep. 27, 1988

[54] POLYDISILACYCLOBUTASILAZANES

[75] Inventor: Gary T. Burns, Midland, Mich.

[73] Assignee: Dow Corning Corporation, Midland, Mich.

[21] Appl. No.: 59,717

[22] Filed: Jun. 8, 1987

[51] Int. Cl.$^4$ .................. C08G 77/04; C08G 77/00
[52] U.S. Cl. ........................... 528/33; 528/10; 528/32; 528/37; 528/38; 528/40; 501/88; 501/97
[58] Field of Search ............ 528/37, 10, 33, 40, 528/32, 28, 38, 25; 556/409, 412, 410; 501/97, 88, 154

[56] References Cited

U.S. PATENT DOCUMENTS

| | | | |
|---|---|---|---|
| 3,293,194 | 12/1966 | Lovie et al. | 528/37 |
| 3,719,696 | 3/1973 | Jonas et al. | 260/448.2 |
| 4,159,259 | 6/1979 | Yajima et al. | 528/14 |
| 4,312,970 | 1/1982 | Gaul Jr. | 526/279 |
| 4,340,619 | 7/1982 | Gaul Jr. | 427/228 |
| 4,395,460 | 7/1983 | Gaul | 428/408 |
| 4,397,828 | 8/1983 | Seyferth et al. | 423/344 |
| 4,404,153 | 9/1983 | Gaul Jr. | 264/29.2 |
| 4,482,689 | 11/1984 | Haluska | 528/25 |
| 4,535,007 | 8/1985 | Cannady | 427/226 |
| 4,543,344 | 9/1985 | Cannady | 501/92 |

Primary Examiner—John C. Bleutge
Assistant Examiner—Ralph H. Dean, Jr.
Attorney, Agent, or Firm—James E. Bittell

[57] ABSTRACT

Polydisilacyclobutasilazanes are prepared by a process of reacting chlorodisilacyclobutane with cyclic silazanes. The polymers are crosslinkable and ceramifiable.

13 Claims, No Drawings

POLYDISILACYCLOBUTASILAZANES

BACKGROUND OF INVENTION

This invention deals with new and novel polydisilacyclobutasilazanes, a method for their preparation, their use to prepare ceramic materials and the ceramic materials produced thereby. Said invention resides in the use of certain cyclic silazanes or mixtures of such cyclicsilazanes with chlorodisilacyclobutanes.

Of the numerous problems that plague the successful commercialization of ceramic materials, the one that causes the most concern is the inability to create preceramic polymers that can be handled and shaped and retain such shapes upon the eventual firing of the shaped preceramic to a useful article. Certain preceramic polymers can be crosslinked to allow the handling and the retention of the shape of the article, but articles prepared from such crosslinked preceramic polymers are thermally unstable and tend to shrink in size and lose integrity through the loss of physical properties. These problems are due in large part to the manner of crosslinking the preceramic polymers, since almost all preceramic polymers in existence today depend upon either air, moisture, or a combination of both, to achieve a cured preceramic polymer capable of maintaining its shape during pyrolysis. Oxygen contents of ten to fifteen percent are not uncommon for ceramics derived from these oxidative cures. However, the high oxygen content in the ceramic, especially those with excess carbon, is generally detrimental, leading to the loss of carbon monoxide from the ceramic at high temperature, owing to the reaction of carbon and oxygen at such high temperatures. This phenomena results in decreased ceramic properties and integrity. Thus, nonoxidative cures for preceramic polymers would be desirable.

Very few non-oxidative type curing polymers are known. R. West et al., J. Am. Chem. Soc. 103, 7352 (1981), have prepared copolymers of dimethylsilylene and phenylmethyl-silylene units, i.e. polysilastyrene, which crosslinks upon UV irradiation. Seyforth et al., Comm. Am. Cer. Soc. C-132 (1984), disclose the preparation of a methylhydridosilazane which is soluble in organic solvents, but does not melt upon heating.

Burns, the inventor herein has disclosed non-oxidative cures using chlorosilacyclobutanes reacted with certain nitrogen containing difunctional nucleophiles to give handleable silacycle containing polysilacyclobutasilazanes which can be cured in the absence of air to give shapeable preceramic polymers which give thermally stable ceramics upon firing to elevated temperatures. Such disclosures are set forth in Burns's co-pending applications entitled, "Polysilacyclobutasilazanes" and "Silane-Modified Polysilacyclobutasilazanes", filed on even date herewith.

Silazane polymers, as a class of ceramifiable materials, have received considerable publication since the Mid-1970's, in both patents and professional journals.

Gaul, in U.S. Pat. No. 4,340,619, issued July 20, 1982 discloses ceramic materials which he obtained by pyrolysis of preceramic polymers, which polymers were prepared by reacting chlorine-containing disilanes and disilazanes.

Gaul, in U.S. Pat. No. 4,321,970 issued Jan. 26, 1982 discloses the preparation of polysilazane polymers that were synthesized by reacting various alkyltrichlorosilanes with hexamethyldisilazane.

Cannady in U.S. Pat. No. 4,543,344, issued July 3, 1985, describe a modification to Gaul's process to include the preparation of a polyhydridomethylsilazane polymers from trichlorosilazane and hexamethyldisilazane.

Additional polymers have been developed and disclosed by Gaul in U.S. Pat. No. 4,395,460, issued July 26, 1983; U.S. Pat. No. 4,404,153, issued Sept. 13, 1983; Haluska in U.S. Pat. No. 4,482,689, issued Nov. 13, 1984; Seyferth et al., in U.S. Pat. No. 4,397,828, issued Aug. 9, 1983; Cannady in U.S. Pat. No. 4,535,007, issued Aug. 13, 1985; Bujalski, U.S. Pat. No. application Ser. No. 653,003, filed Sept. 21, 1984, now abandoned; Baney at al., U.S. patent applications Ser. No. 652,938, filed Sept 21, 1984, now abandoned and Ser. No. 652,939, filed Sept. 21, 1984, now abandoned; Haluska U.S. patent application Ser. No. 926,145, filed Nov. 3, 1986, now U.S. Pat. No. 4,745,205, and application Ser. No. 926,607, filed Nov. 4, 1986, now U.S. Pat. No. 4,742,143.

Finally, Jonas et al., in U.S. Pat. No. 3,719,696, issued Mar. 6, 1973 discloses the incorporation of silacycles into siloxane polymers to render such polymers curable. Such silacycles are derived from silacyclobutanes which are cohydrolyzed with other siloxane units to give copolymers.

What has been discovered are new and novel materials, methods for their preparations, their use to prepare crosslinked ceramic polymers, the use of the crosslinked materials to prepare ceramics, and the ceramic materials prepared thereby.

THE INVENTION

This invention relates to a process for preparing polydisilacyclobutasilazanes by the reaction of chloro-1,3-disilacyclobutanes and certain cyclic silazanes at low temperatures.

This invention further comprises the new and novel compositions prepared by the inventive method herein.

This invention also deals with a method of crosslinking the inventive polymers and the subsequent firing of the crosslinked materials to ceramics which method comprises thermally treating the novel compositions to open silacyclic rings contained therein and subsequently pyrolyzing the crosslinked preceramic polymers at elevated temperatures, in a vacuum or an inert atmosphere, until the preceramic polymer is converted to a ceramic material.

The compositions of this invention have the advantage that they can be crosslinked prior to ceramification, by a method which is non-oxidative, thus providing ceramic materials having thermal stability and high retention of physical properties after firing.

Thus, the process of preparation comprises a process for preparing polydisilacyclobutaslaznes comprising:
(I) contacting and reacting in an inert, essentially anhydrous atmosphere, chloro-1,3-disilacyclobutane with a cyclic silazane or a mixture of cyclic silazanes selected from the group consisting of silazanes having the general formula
  (i) $(CH_3RSiNH)_x$ and
  (ii) $(C_6H_5RSiNH)_x$ at a temperature in the range of minus 50° to plus 25° C., for a time sufficient to form polydisilacyclobutasilazanes;
(II) contacting the product from (I) with dry gaseous ammonia;

(III) recovering the polydisilacyclobutasilazane from the reaction mass in (II), wherein each R is independently selected from the group consisting of hydrogen, alkyl radicals having from 1 to 4 carbon atoms, aryl groups, and vinyl groups, and x has a value of 3 to 6.

Generally, the reaction of the disilacyclobutane and the cyclic silazane is carried out in the presence of organic solvents such as chlorinated organic solvents. Preferred for this process is methylene chloride. The solvent is not critical as any organic solvent that allows compatibility of the reactants, without reacting with the cyclic silazanes or the disilacyclobutanes, can be used in this invention.

The reaction is carried out at a low temperature, generally in the range of minus 50° C. to plus 25° C. Preferred temperature range for this process is less than about 10° C. Most preferred is a temperature range of about −30° to −10° C. Although it is not essential, it is preferred to add the disilacyclobutanes to the cyclic silazanes rather than add the cyclic silazanes to the disilacyclobutanes.

The reaction should be essentially dry, as water tends to interfere with the desired result by incorporating oxygen into the final product.

As soon as the reactants have fully come together in the reaction vessel, the vessel, and its contents, can be warmed to about room temperature, which in a sense is heating the reaction, and this warming is preferred to take place over several hours to permit time for the reactants to completely react, the appropriate amount of time being based on the particular cyclic silazane(s) and disilacyclobutanes used, but the reaction generally need not be run for more than 24 hours.

The reaction mass is then cooled to less than 0° C. and the reaction mass is treated with dry gaseous ammonia to reduce the chlorine in the reaction product.

The polymers can then be isolated by filtration or some other known convenient means. The polymers range from oils to paste-like, soft solids.

The disilacyclobutanes useful in this invention are

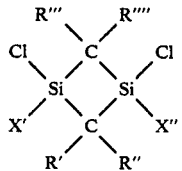

where R′, R″, R‴ and R⁗ are each independently selected from H, alkyl groups containing 1 to 4 carbon atoms aryl groups and vinyl groups; X′ and X″ are halogen (chlorine, bromine or fluorine), alkyl containing 1 to 4 carbon atoms, or aryl groups and vinyl groups; The inventor believes, but should not be held to such a theory, that the polymer is formed by the following reaction (using dimethylcyclictetramer and tetrachlorodisilacyclobutane as the example):

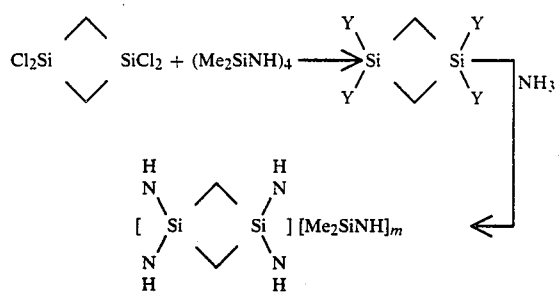

where Y=HN(Me$_2$SiNH)$_n$ Si(Me$_2$)Cl or Cl and n=0–3, m=0–8.

The cyclic silazanes useful in this invention are those having the general formulae (i) (CH$_3$RSiNH)$_x$ and
(ii) (C$_6$H$_5$RSiNH)$_x$ wherein R is selected from the group consisting of hydrogen, alkyl radicals containing 1 to 4 carbon atoms, aryl groups, and vinyl groups, and x has a value of 3, 4, 5, or 6. Preferred for this invention are those cyclic silazanes wherein x has a value of 3 or 4 and R is methyl, vinyl or phenyl. Most preferred are those cyclic silazanes wherein x has a value of 4 and R is methyl.

Mixtures of cyclic silazanes can be used. by "mixture" it is meant for purposes of this invention, that the cyclics can be mixtures wherein x has the value of 3 and 4, or x has a value of 3, 4, and 5, etc. Generally, the cyclic silazanes are used in such mixtures wherein the cyclic tetramer predominates, that is, the cyclic tetramer is present in the mixture in more than fifty weight percent. "Mixtures" can also mean, for example, cyclic tetramer having different substituents or silicon can be used. For example, [(CH$_3$)$_2$SiNH]$_4$ and [(CH$_3$)(CH$_2$=CH)SiNH]$_4$ can be used together to give mixed polymers.

This invention also deals with a method of crosslinking the inventive polymers and the crosslinked polymers as compositions of matter.

The method of crosslinking the polydisilacyclobutasilazanes of this invention is carried out by heating the polymers to initiate the ring opening of the silacycles contained in the polymers. The preferred temperature range is from 170° to 250° C.

Catalysts and heat may also be used to bring about the initiation of the ring opening to cause crosslinking. Catalysts useful in this regard are, for example, metal hydrides, such as sodium or potassium hydride; metal alkoxides, for example, sodium or lithium methoxides; metal amides, for example, lithium diethylamide, rhodium catalysts, such as for example, Wilkinson's catalyst and platinum catalysts, such as for example, chloroplatinic acid.

This invention also deals with a method of preparing ceramic materials, the method comprising pyrolyzing a crosslinked composition at a temperature of at least 700° C. under inert atmosphere or in a vacuum for a time sufficient to convert the composition to a ceramic material, the improvement comprising, using a crosslinked composition which has been obtained by a process which comprises:

(I) contacting and reacting in an inert, essentially anhydrous atmosphere, chloro-1,3-disilacyclobutane with a cyclic silazane or a mixture of cyclic silazanes selected from the group consisting of silazanes having the general formula
(i) $(CH_3RSiNH)_x$ and
(ii) $(C_6H_5RSiNH)_x$
at a temperature in the range of minus 50° to plus 25° C., for a time sufficient to form polydisilacyclobutasilazanes;
(II) contacting the product from (I) with dry gaseous ammonia;
(III) recovering the polydisilacyclobutasilazane from the reaction mass in (II);
(IV) heating the product from (III) to cause crosslinking of the product;
(V) pyrolyzing the crosslinked product from (IV) until it ceramifies.

For purposes of this invention, whenever "inert" is used herein, it means the use of gases inert to the reactants herein and also inert to the forming ceramic material during pyrolysis. Such gases can be, for example, argon, helium and the like. A vacuum is also useful in certain instances in order to avoid contamination by water, oxygen and the like.

"Essentially anhydrous" for purposes of this invention means that precautions should be taken to exclude water from the reactants and the resulting products as even small amounts of moisture can affect the resulting product, it being recognized by those skilled in the art that absolute dryness is not absolutely required herein.

Now that those skilled in the art can more fully understand and appreciate the invention described herein, the following examples are presented. These examples should not be used to limit the scope of this invention as it is delineated in the claims.

EXAMPLE 1

A 100 ml, 3-necked, round-bottomed glass flask fitted with a mechanical stirrer, Dewar condenser with a gas outlet and gas inlet tube, was charged with a solution of 3.284 gms (0.0449 mole) of octamethylcyclotetrasilazane in 50 ml of methylene chloride. The solution was cooled to −5° C. and 4.35 gms 0.0192 mole) of 1,1,3,3-tetrachloro-1,3-disilacyclobutane was added in one portion. The reaction mass was warmed to about 25° C. over a 16 hour period. The material was then recooled to −20° C. and dry gaseous ammonia was rapidly bubbled through the solution for four hours. After warming to room temperature, the solution was filtered through Celite and concentrated in vacuo to afford 2.50 gms of a clear, soft gum for a yield of 45.7%. Elemental analysis showed 29.2% C, 9.42% H, 18.1% N and 42.5% Si.

EXAMPLE 2

The polymer prepared in Example 1 was crosslinked in argon by heating to a temperature of about 180°–185° C. This polymer was placed in a mullite boat and transferred, under argon, to a 4" three-zone Lindberg tube furnace. The sample was pyrolyzed in an argon atmosphere to 1200° C. at 5° C./min., held at 1200° C. for 30–40 minutes and then allowed to cool to room temperature over a 14–18 hour interval.

The polymer had a bulk char yield of 77.2%. Elemental analysis of the ceramic showed 19.4% C, 20.0% N, 55.4% Si and 3.90% O.

I claim:

1. A process for preparing polydisilacyclobutasilazane comprising:
(I) contacting and reacting in an inert, essentially anhydrous atmosphere, a chloro-1,3-disilacyclobutane having the formula,

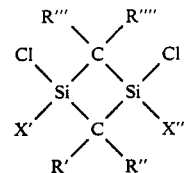

where R', R", R''' and R'''' are each independently selected from the group consisting of H, alkyl groups containing 1 to 4 carbon atoms, aryl groups and vinyl groups and both X' and X" are selected from the group consisting of chlorine, bromine, fluorine, alkyl groups containing 1 to 4 carbon atoms, aryl groups and vinyl groups, with a cyclic silazane or a mixture of cyclic silazanes selected from the group consisting of silazanes having the general formula
(i) $(CH_3RSiNH)_x$ and
(ii) $(C_6H_5RSiNH)_x$
wherein each R is independently selected from the group consisting of hydrogen, alkyl radicals containing 1 to 4 carbon atoms, aryl groups, and vinyl groups, and x has a value of 3, 4, 5, or 6, at a temperature in the range of minus 50° to plus 25° C., for a time sufficient to form polydisilacyclobutasilazanes;
(II) contacting the product from (I) with essentially anhydrous gaseous ammonia;
(III) recovering the polydisilacyclobutasilazane from the reaction mass in (II).

2. A process as claimed in claim 1 wherein the reaction is carried out at a temperature in the range of minus 50° to plus 10° C.

3. A process as claimed in claim 2 wherein the reaction is carried out at a temperature in the range of minus 30° to minus 10° C.

4. A process as claimed in claim 2 wherein the reaction is carried out for at least two hours.

5. A composition prepared by the process as claimed in claim 1.

6. A composition prepared by the process as claimed in claim 1 wherein the chloro-1,3-disilacyclobutane is 1,1,3,3,-tetrachloro-1,3-disilacyclobutane.

7. A method of crosslinking the composition of claim 5, the method comprising heating the composition in the absence of air to a temperature of 170° to 250° C.

8. A method as claimed in claim 7 wherein the composition is heated to a temperature of 180° to 200° C.

9. A method of crosslinking the composition of claim 5, the method comprising heating the composition in the presence of essentially anhydrous air to a temperature in the range of 170° to 250° C.

10. A composition prepared by the method of claim 7.

11. A composition prepared by the process as claimed in claim 7 wherein the chloro-1,3-disilacyclobutane is 1,1,3,3,-tetrachloro-1,3-disilacyclobutane.

12. A composition prepared by the method of claim 9.

13. A composition prepared by the process as claimed in claim 9 wherein the chloro-1,3-disilacyclobutane is 1,1,3,3,-tetrachloro-1,3-disilacyclobutane.

* * * * *